(12) United States Patent
Gillis et al.

(10) Patent No.: US 8,751,276 B2
(45) Date of Patent: Jun. 10, 2014

(54) CAPTURING AND PROCESSING DATA GENERATED IN AN ERP INTERIM PHASE

(75) Inventors: Jason B. Gillis, Olmstead Falls, OH (US); Edin Beganovic, Oakland, CA (US)

(73) Assignee: Accenture Global Services Limited, Dublin (IE)

(*) Notice: Subject to any disclaimer, the term of this patent is extended or adjusted under 35 U.S.C. 154(b) by 208 days.

(21) Appl. No.: 12/843,246

(22) Filed: Jul. 26, 2010

(65) Prior Publication Data

US 2012/0022911 A1   Jan. 26, 2012

(51) Int. Cl.
*G06Q 10/00* (2012.01)
(52) U.S. Cl.
USPC ............................................. 705/7.12
(58) Field of Classification Search
USPC ................................. 705/7.11–7.42
See application file for complete search history.

(56) References Cited

U.S. PATENT DOCUMENTS

| | | | |
|---|---|---|---|
| 6,993,657 B1 * | 1/2006 | Renner et al. | 713/182 |
| 7,908,584 B2 * | 3/2011 | Singh et al. | 717/106 |
| 2004/0139175 A1 * | 7/2004 | Lin | 709/220 |
| 2004/0158607 A1 | 8/2004 | Coppinger et al. | |
| 2004/0249650 A1 * | 12/2004 | Freedman et al. | 705/1 |
| 2005/0144610 A1 * | 6/2005 | Zenz | 717/168 |
| 2006/0206583 A1 * | 9/2006 | Hill | 709/218 |
| 2007/0078861 A1 * | 4/2007 | Aidun | 707/10 |
| 2007/0118386 A1 * | 5/2007 | Mueller et al. | 705/1 |
| 2008/0065680 A1 * | 3/2008 | Moon et al. | 707/102 |
| 2008/0098099 A1 * | 4/2008 | Khasnis et al. | 709/222 |
| 2008/0114628 A1 * | 5/2008 | Johnson et al. | 705/7 |
| 2008/0140490 A1 * | 6/2008 | Wang et al. | 705/8 |
| 2008/0263079 A1 * | 10/2008 | Soneji et al. | 707/102 |
| 2008/0313242 A1 * | 12/2008 | Doerr | 707/202 |
| 2009/0024713 A1 * | 1/2009 | Strasenburgh et al. | 709/208 |
| 2009/0144118 A1 * | 6/2009 | Zelig et al. | 705/8 |
| 2009/0171720 A1 * | 7/2009 | Crook et al. | 705/7 |
| 2010/0088281 A1 * | 4/2010 | Driesen et al. | 707/641 |
| 2010/0251247 A1 * | 9/2010 | Pedersen | 718/102 |
| 2011/0099266 A1 * | 4/2011 | Calder et al. | 709/224 |

* cited by examiner

*Primary Examiner* — Sujay Koneru
(74) *Attorney, Agent, or Firm* — Mannava & Kang, P.C.

(57) ABSTRACT

The disclosure provides a system and method for identifying a set of ERP tasks performed by the ERP system when it is functional and for identifying a set of Interim Business Processes (IBPs) associated with ERP tasks. The method includes creating a set of IBP data capture tools Another step is assigning an IBP data capture tool to each IBP optionally using an IBP data main coordinating tool. Another step is identifying a set of responsibility centers in the business entity. Another step is providing an access link to each responsibility center to the IBP data capture tool and sending a notice to each responsibility center to begin capturing data at a predetermined time. Another step is receiving the IBP data from the IBP data capture tools optionally using the IBP data main coordinating tool, and storing the IBP data received optionally using the IBP data main coordinating tool.

27 Claims, 4 Drawing Sheets

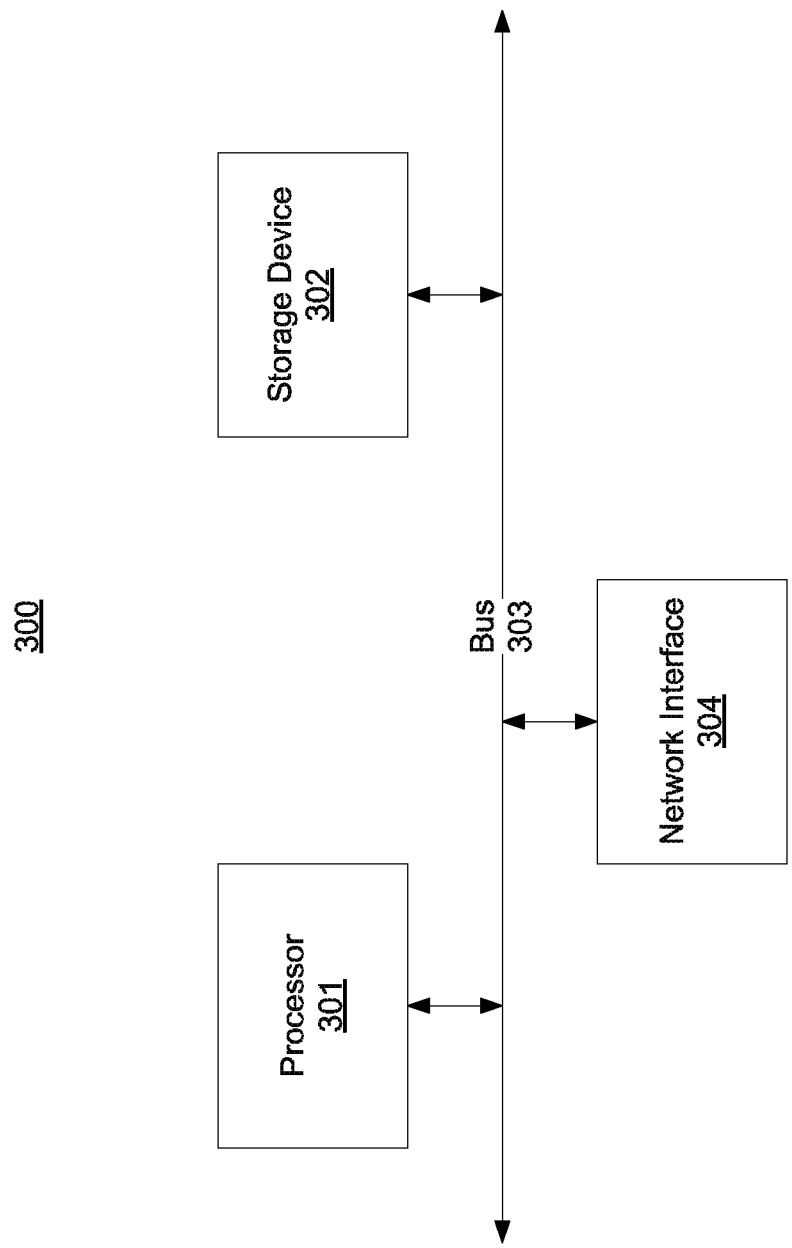

ed during the

CAPTURING AND PROCESSING DATA GENERATED IN AN ERP INTERIM PHASE

BACKGROUND

An enterprise resource planning (ERP) system is an integrated computer-based system used within a company, or other business entity, to record transactions, share information, and manage internal and external resources at the company. A typical ERP system has a software architecture. A general goal of the ERP system is to facilitate the flow of information between all the business functions within the operational boundaries of the company. Another general goal of the ERP system is to consolidate all the business operations throughout the company into a uniform and company-wide ERP system environment.

An ERP system might reside on a centralized server, or it can be distributed across modular hardware and software units which provide services and communicate on, for example, a local area network. Generally, the ERP system is built around a centralized ERP system database and typically utilizes a common computing platform. A distributed ERP system design allows a company to assemble modules, possibly from different vendors, without the need for placing multiple implementations of complex, expensive computer hardware and software systems within areas of the company which will not utilize their full capacity. However, this distributed type of ERP system design may also increase the likelihood of a partial ERP system failure at one or more of the individual modules.

In an implementation of a new ERP system, such as in the replacement of an old ERP system, a company often seeks the help of an ERP system vendor or a third-party consulting firm because of the complexities involved in the transition steps needed to carry out the implementation or replacement. Generally, in the replacement of an old ERP system with a new ERP system, the new ERP system and the old ERP system are not run concurrently during the transition due to the cost of collecting and processing data in dual systems and the risks relating to data integrity which are inherent in running two ERP systems simultaneously. The process of transitioning between ERP systems ordinarily takes a period of multiple days in length. This period is often referred to as an ERP "black-out" period. However, during an ERP black-out period, a company can still have a need to operate and, as such, generate business data which may be lost or otherwise jeopardized due to the lack of a functioning ERP system during the ERP blackout period.

A similar situation can arise if an ERP system at a company is temporarily incapacitated or otherwise becomes inaccessible to a company. This type of circumstance can occur when the ERP system at a company breaks down due to a system failure, a security breach, or some other intervening circumstance. This type of black-out period can be short in time or of a longer length. Despite the circumstances by which an ERP system is temporarily non-functional, the business needs to be able to perform its business functions during the black-out period. Also, data generated by a company during any type of ERP black-out period needs to be preserved. Furthermore, this business data needs to be incorporated into the ERP database of the company ERP system once it becomes functional again. Or in a related circumstance that occurs in a transition between an old ERP system and a new ERP system which replaces it, the business data generated during the black-out period needs to be migrated into the ERP database for access by the new ERP system.

BRIEF SUMMARY OF THE INVENTION

One embodiment of the disclosure presents a system to capture and process interim business process (IBP) data generated in a set of interim business processes (IBPs) by an entity operating in an interim phase during which an enterprise resource planning (ERP) system of the entity is non-functional. The system includes a mapping module configured to identify a set of responsibility centers in the entity, each responsibility center having a responsibility for performing one or more IBPs in the set of IBPs, identify a set of ERP tasks performed by the ERP system when it is functional, and identify the IBPs in the set, each IBP being associated with an ERP task in the set of ERP tasks which is performed by the ERP system when it is functional. The system also includes an implementation module configured to create a set of IBP data capture tools, each IBP data capture tool in the set being associated with an IBP in the set of IBPs, assign each IBP data capture tool to each associated IBP. The IBP data is captured using the IBP data capture tools and each IBP data capture tool captures the IBP data of the associated IBP. The implementation module provides an access link to each responsibility center to access IBP data capture tools for the responsibility center, and sends a notice to each responsibility center to begin capturing, at a predetermined time during the interim phase, the IBP data associated with each IBP of the responsibility center using the IBP data main coordinating tool. The system also includes a data management module configured to receive the IBP data from the IBP data capture tools, and store the IBP data received.

Another embodiment of the disclosure presents a system configured to capture and process IBP data generated in a set of IBPs by an entity operating in an interim phase during which an ERP system of the entity is non-functional. The system includes a data storage device configured to store an IBP data main coordinating tool, a set of IBP data capture tools, the IBP data, a set of ERP tasks performed by the ERP system when it is functional, and a set of responsibility center identities in the entity. Each responsibility center has a responsibility for performing an IBP. The IBP data is captured, using the set of IBP data capture tools. Each IBP data capture tool in the set is for capturing the IBP data of an IBP of the entity in the set of IBPs, wherein the IBP is associated with an ERP task which is performed by the ERP system when it is functional. The system also includes a processor configured to send access links, using the IBP data main coordinating tool, to the responsibility centers for accessing the IBP data capture tools to allow the responsibility centers to operate the IBP data capture tools. The processer is also configured to send notices to the responsibility centers to begin using the IBP data capture tools at a predetermined time, for each IBP, during the interim phase, and receive the IBP data captured by the IBP data capture tools, and store the IBP data captured using the IBP data capture tools on the data storage device.

Another embodiment of the disclosure presents a method for capturing and processing IBP data generated in a set of IBPs by an entity operating in an interim phase during which an ERP system of the entity is non-functional. The method includes identifying a set of ERP tasks performed by the ERP system when it is functional, identifying a set of IBPs, each IBP in the set of IBPs being associated with an ERP task in the set of ERP tasks which is performed by the ERP system when it is functional. Another step is creating a set of IBP data capture tools, each IBP data capture tool in the set being associated with an IBP in the set of IBPs and assigning each IBP data capture tool to each IBP in the set of IBPs wherein the IBP data is captured using an IBP data main coordinating tool and a set of IBP data capture tools. Each IBP data capture tool in the set is for capturing the IBP data of an IBP of the entity. The method also includes identifying a set of responsibility centers in the business entity, each responsibility center having a responsibility for performing one or more IBPs in the set of IBPs. The method also includes providing an access link to each responsibility center to the IBP data capture tool corresponding to each IBP of the responsibility center and sending a notice to each responsibility center to begin capturing, at a predetermined time during the interim phase, the IBP data associated with each IBP of the responsibility center. The method also includes capturing the IBP data during the interim phase using the IBP data capture tools, receiving the IBP data from the IBP data capture tools and storing the IBP data received.

Another embodiment of the disclosure presents a computer readable medium including instructions executable on at least one processor for executing a method for capturing and processing IBP data generated in a set of IBPs by an entity operating in an interim phase during which an ERP system of the business entity is non-functional. The method includes identifying a set of ERP tasks performed by the ERP system when it is functional, identifying a set of IBPs, each IBP in the set of IBPs being associated with an ERP task in the set of ERP tasks which is performed by the ERP system when it is functional. Another step is creating a set of IBP data capture tools, each IBP data capture tool in the set being associated with an IBP in the set of IBPs and assigning each IBP data capture tool to each IBP in the set of IBPs wherein the IBP data is captured using an IBP data main coordinating tool and a set of IBP data capture tools. Each IBP data capture tool in the set is for capturing the IBP data of an IBP of the entity. The method also includes identifying a set of responsibility centers in the business entity, each responsibility center having a responsibility for performing one or more IBPs in the set of IBPs. The method also includes providing an access link to each responsibility center to the IBP data capture tool corresponding to each IBP of the responsibility center and sending a notice to each responsibility center to begin capturing, at a predetermined time during the interim phase, the IBP data associated with each IBP of the responsibility center. The method also includes capturing the IBP data during the interim phase using the IBP data capture tools, receiving the IBP data from the IBP data capture tools and storing the IBP data received.

BRIEF DESCRIPTION OF DRAWINGS

Embodiments are described in detail in the following description with reference to the following figures.

FIG. 3 illustrates a computer system configured to provide a hardware platform for the system shown in FIG. 1, according to an embodiment.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

Systems, methods are disclosed for preserving and collecting the business data generated by an entity during an ERP system blackout period so this data can be added to the ERP system database. By preserving and collecting this business data, the systems and methods provide for increased integrity of the data in the ERP database at the company, increased operating and production efficiency in the company, and increased profits for a company relying on an ERP system having a higher integrity ERP system database. Also, decreases in waste for all types of resources utilized at the company can be achieved through the operation of the ERP system having a higher integrity ERP database.

1. System

Figure 1A:
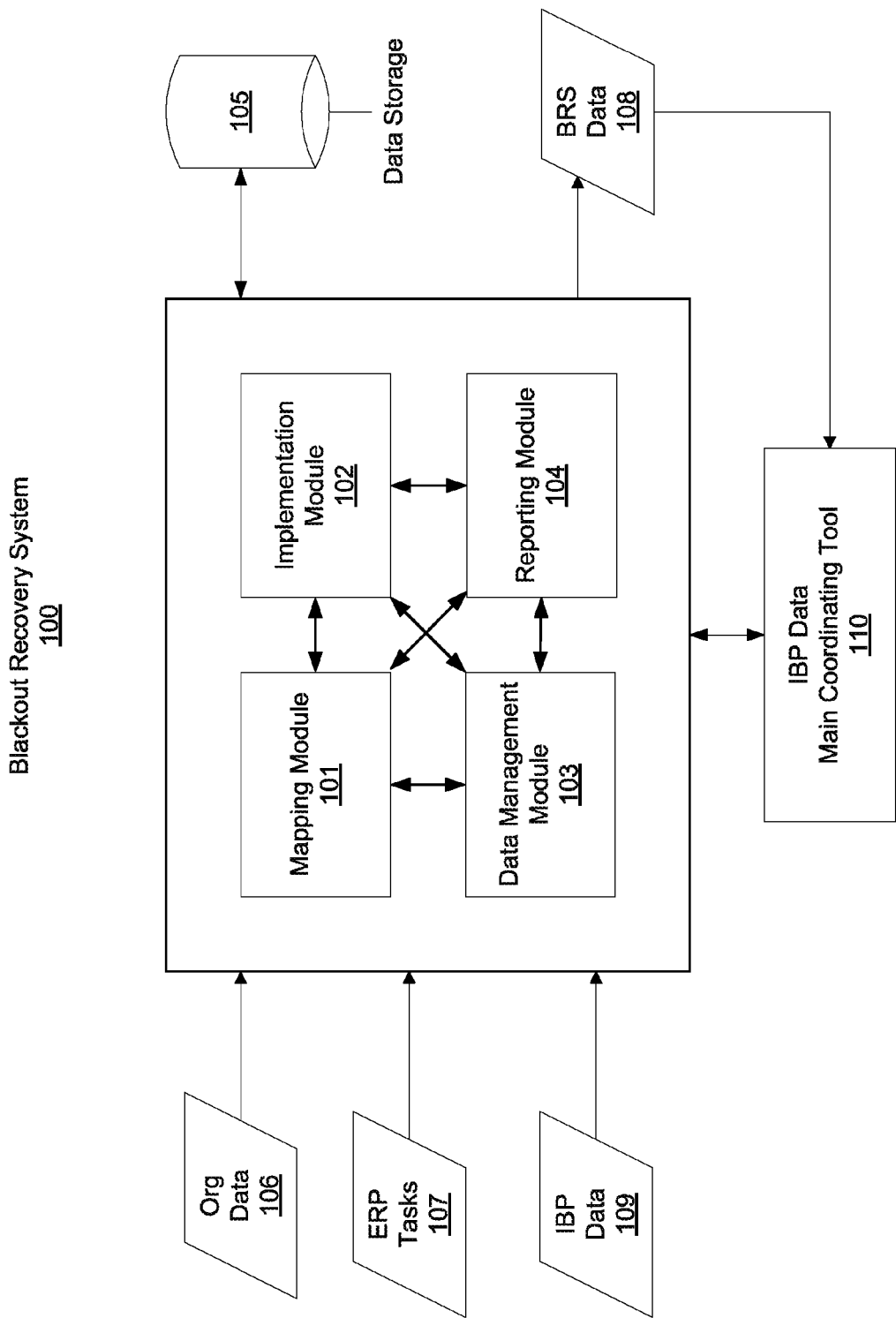
FIG. 1A illustrates a system, according to an embodiment.

FIG. 1A illustrates a blackout recovery (BR) system 100, according to an embodiment. The BR system 100 includes a data storage 105, a mapping module 101, an implementation module 102, a data management module 103, and a reporting module 104. These modules in the BR system 100 can operate separately as separate modules in the BR system 100, or can operate in a combined operation of the BR system 100, as one or more combination modules in the BR system 100.

The BR system 100 receives org data 106 and ERP tasks 107 in a data initialization of the BR system 100. The org data 106 is data relating to the organizational structure of a a company or any entity which is utilizing the BR system 100. Examples of the org data 106 can include the identities of the persons, groups or resources which are responsible for the business processes and functions in the company. The ERP tasks 107 are data describing the actual ERP tasks performed by an ERP system at the company. The actual ERP tasks may include recording and communicating information generated by the company in the business processes of the company and other tasks associated with the business processes. Recording may include generating, entering, and/or storing data. The org data 106 and the ERP tasks 107 are stored in the data storage 105 of the BR system 100.

The mapping module 101 utilizes the org data 106 and the ERP tasks 107 to map the ERP tasks 107 performed by the ERP system of the company to the actual business processes of the company which generate the underlying business data. This business data is ordinarily recorded and communicated through the ERP tasks 107 in the ERP system of the company when the ERP system is functional. However, the actual business data which is generated during an ERP blackout period is referred to herein as interim business process (IBP) data 109. The IBP data 109 is the business data generated through the actual business processes which correspond to the ERP tasks 107. An IBP is an actual business process as it occurs during an ERP blackout period. Each IBP corresponds to an ERP task that would operate in the ERP system if it were functional. However, the ERP system does not function during an ERP blackout period.

The mapping module 101 also utilizes the org data 106 in a further mapping process to map the identity of individuals, groups or resource points in a company which have a responsibility for recording and communicating the business data associated with each business process corresponding with each ERP task in the ERP tasks 107. These individuals, groups and/or resources in a company which have these responsibilities are called responsibility centers. The org data 106 includes contact information that is associated with each of the responsibility centers in the company. In general, the mapping module 101 assigns the identity of each individual responsibility center to an individual IBP. However, the identity of a responsibility center may be assigned to multiple IBPs, for example, if the responsibility center performs or generates business data for multiple ERP tasks. In addition, there can be other circumstances in which multiple responsibility center identities are assigned to a single IBP.

IBP data capture tools are associated with the implementation module 102. IBP data capture tools may be created in advance and stored with an IBP data main coordinating tool 110 in the BR system 100, or the IBP data capture tools may be created through the implementation module 102. For example, data fields are identified from an ERP database that are associated with specific ERP tasks. The data fields are converted to data fields for corresponding IBP data capture tools. In one example, templates for the data capture tools may be stored in the data storage 105 and modified by the implementation module 102 to include the data fields to solicit the information from users or system performing the IBP associated with the ERP task. In this manner, the implementation module 102 can automatically create the data capture tools. A more detailed description of the IBP data capture tools and the IBP data main coordinating tool 110 is found below with respect to FIG. 1B. A tool and modules may include software running on a computer system and stored in a data storage device.

The implementation module 102 has two major functions. The first major function is associating each IBP with an IBP data capture tool and providing each responsibility center assigned to an IBP with access to the corresponding IBP data capture tool. As noted above, the responsibility centers are the individuals, groups and/or resource points in the company which have the responsibility for recording and communicating the actual business data associated with each actual business process corresponding with each ERP task in the ERP tasks 107. The access to an IBP data capture tool can be provided to the responsibility centers by, for instance, sending a copy of the IBP data capture tool to the responsibility center via an email using the contact information of a person in the responsibility center. Another route can be simply to send an HTML linkage via an email to the responsibility center. The data capture tool may be a customized spreadsheet or a specialized computer program providing the functionality for the IBP data capture. The access linkage provides a direct access to a folder, stored on the local area network, and containing the IBP data capture tool.

The other major function of the implementation module 102 is sending one or more notices to the responsibility center when they are to begin operating the IBP data capture tool at a predetermined time during the ERP blackout period. This predetermined time may be determined in advance based on the IBP, such as for IBP relating to an actual business process that is periodically performed, regardless of other business activity, as in end-of-day reporting. Or the predetermined time may be determined as contingent upon a predetermined action involving another IBP, such as recording an accounts receivable after a sales order has been processed based on a sale made on credit terms. The mapping module 101 may determine the sequence and or time periods for performing IBPs and contingencies or rules for performing the IBPs. This information is provided to the implementation module 102, and the implementation module 102 sends notices to the responsibility centers indicating when they are to begin operating the IBP data capture tools associated with the IBPS during the ERP blackout period.

Also, in addition to sending notices to responsibility centers, the implementation module 102 may receive return notices from the responsibility centers after the responsibility center has completed an IBP data capture tool operation using an IBP data capture tool. For instance, after a sales order in a sales order IBP has been processed and recorded using a sales order IBP data capture tool, the responsibility center will send a return notice to the IBP data main data coordinating tool residing with the implementation module 102 or elsewhere the BR system 100. The IBP data main coordinating tool 110 may then send a subsequent notice to a responsibility center for the accounts receivable IBP to record IBP data relating to an accounts receivable based on the sales order. The notices going into the BR system 100 constitute one type of an IBP data 109. The notices going out from the BR system 100 constitute one type of BRS data 108. BRS data 108 is any data generated by the BR system 100.

The BR system 100 can also include the data management module 103 and the reporting module 104. The data management module 103 can be used, among other things, to accept and process the incoming IBP data 109 and store it on the storage device 105. The reporting module can be used, among other things, to retrieve the IBP data 109 stored on the storage device 105 and to send as the IBP data 109/BRS data 108 to other systems. For example, the BRS data 108 is sent to the company ERP database for use in migrating to the company ERP system following the blackout period.

2. Examples of IBP Data Tools (Main Coordinating and Capture)

Figure 1B:
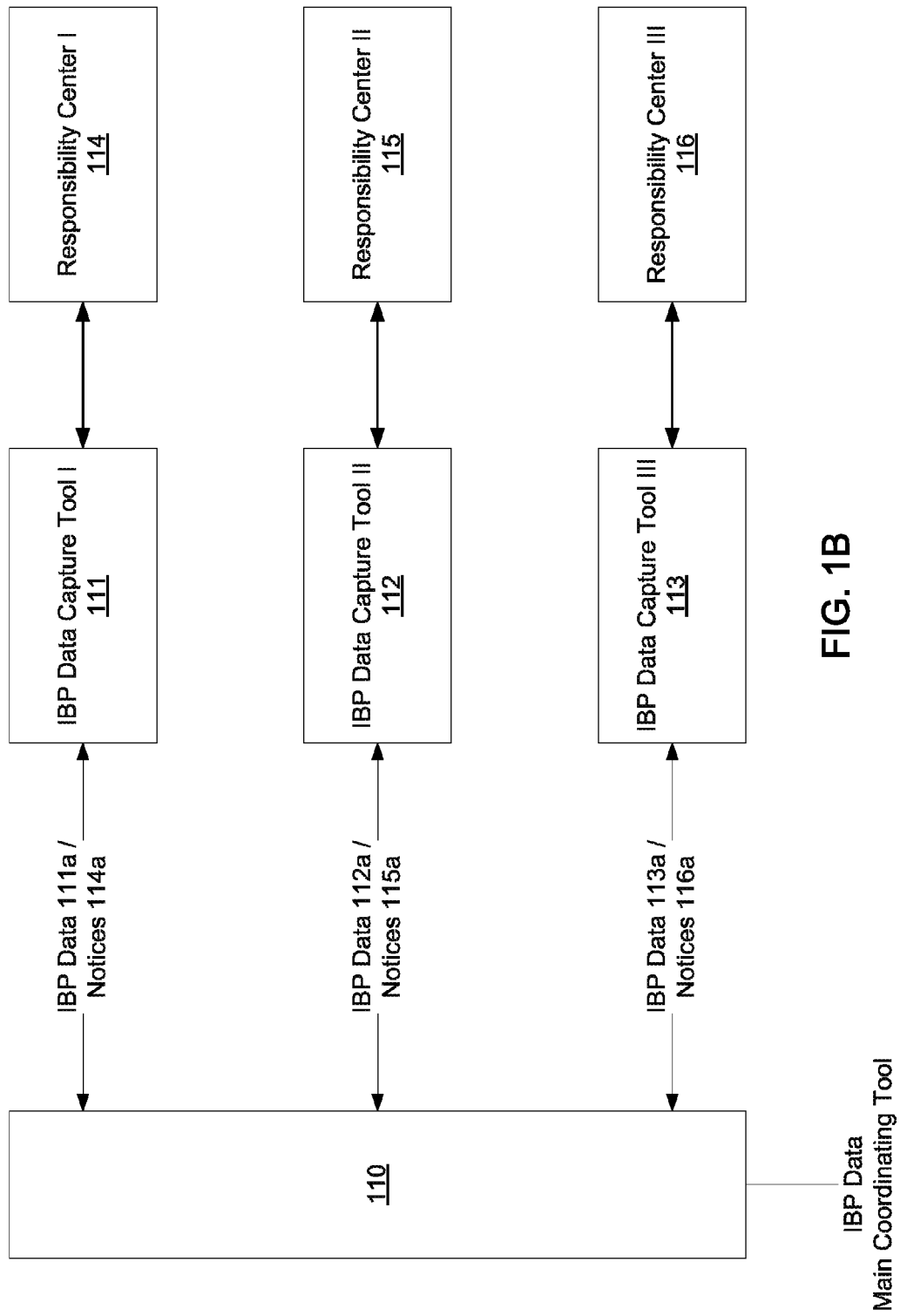
FIG. 1B illustrates another system, according to an embodiment.

FIG. 1B is another system illustrating the relationship and operations among the different IBP data tools and responsibility centers generally referenced above, according to an embodiment. In Figure 1B, an IBP data main coordinating tool 110 communicates with a responsibility center I 114, a responsibility center II 115, and a responsibility center III 116 through, respectively, an IBP data capture tool I 111, an IBP data capture tool II 112 and an IBP data capture tool III 113, respectively. According to an embodiment, the IBP data main coordinating tool 110 sends notices 114a to responsibility center I 114 indicating when to begin capturing IBP data 111a using IBP data capture tool I 111. Once IBP data 111a is captured, the responsibility center I 114 sends IBP data 111a back to IBP data main coordinating tool 110. Similarly, notices 115a and 116a as well as IBP data 112a and 113a are captured and/or communicated with respect to the responsibility center II 115 and the responsibility center III 116, respectively.

The IBP data main coordinating tool 110 has the general role of facilitating the execution of IBPs during an ERP blackout period using a correct execution sequence and IBP data capture tools, such as the IBP data capture tools 111-113. It also facilitates the recovery of IBP data into a data migration sent to the ERP database from the IBP data stored on the data storage 105. According to an embodiment, the IBP data main coordinating tool 110 has a software based architecture and can be fully automated or operated by an IBP data main coordinator (not shown). The IBP main data coordinator can be a responsibility center, as described above, which has a responsibility for operating the IBP data main coordinating tool 110. The software based architecture of the IBP data main coordinating tool 110 can be, generally, a computer program. According to one embodiment, the computer program is a database with programmed subroutines for requesting org data 106, ERP tasks 107 and IBP data 109 and sending BRS data 108. According to another embodiment, the computer program is a spreadsheet with programmed subroutines for requesting org data 106, ERP tasks 107 and IBP data 109 and sending BRS data 108.

According to an embodiment, the IBP data main coordinating tool 110 can have access to data folders stored on the data storage 105 containing the IBP data capture tools 111-113, which can also be a software based architecture and can be fully automated or operated by a designated operator in the responsibility centers 114-116. The IBP data capture tools 111-113, according to an embodiment, includes a detailed instruction set for each responsibility center 111-113 to capture the IBP data 111*a*-113*a* for each respective assigned IBP. The IBP data capture tools 111-113 can also include executable forms and templates for capturing transactions and other activity as IBP data 111*a*-113*a*. A more detailed example of the detailed instruction set in an exemplary IBP data capture tool is found below.

According to one embodiment, the IBP data main coordinating tool 110 can operate as a high level end-to-end order fulfillment process during the ERP blackout period for such functions as order entry, mid-term production planning, short term production planning and detailed scheduling for intermediate products and finished products, procurement planning, intercompany inventory stock movement planning, quality management, accounts payable and intercompany invoicing, intermediate product manufacturing, finished product manufacturing, accounts payable/accounts receivable processing, and the like. According to the embodiment, the high level end to end order fulfillment process can be broken down into applicable sub-processes. For example, procurement planning can be broken down into the sub-processes for purchase order supplier allocation, creating the purchase order, releasing the purchase order, purchase order price validation, intracompany inventory stock order processing, procurement receipts processing, and the like.

A typical IBP data main coordinating tool 110, according to an embodiment, helps ensure the efficient execution of the IBPs, wherein certain IBPs can be executed and captured data recovered, concurrently. For instance, in a typical company, the business process of sales order creation precedes the business process of credit management which both precede advanced planning optimization (APO) for mainline business operations. In a typical ERP system, these ERP tasks (sales order creation, credit management and APO) also precede the ERP tasks for mainline business operations which are then followed by the ERP tasks, normally done sequentially, for delivery processing, invoice processing and accounts receivable processing. However, in a typical ERP system, the ERP tasks for mainline business operations can run concurrently. These include the ERP tasks for purchasing, contract management, production planning, supply network planning, goods receipt processing, invoice verification, material valuation, integrated reporting and the supply of data for strategic vendor analysis. According to an embodiment, the IBPs which correspond to the ERP tasks for mainline business operations can also run concurrently as can IBPs for other ERP tasks.

According to an embodiment, the different IBPs managed through the IBP data main coordinating tool 110 can be organized by focus area. A focus area, is a grouping of all IBPs relating to a type of business function involving multiple IBPs. For example, order to cash (OTC) processes in an ERP system typically relate to the ERP processes in that system involving sales orders and accepting payments for goods. So some examples of IBPs in a typical OTC focus area could include different IBPs for consignment processing, sales order creation, open sales order processing, credit management, invoice processing, rebate/commission processing, credit/debit memo processing or other IBPs for similar functions relating to sales orders and accepting payments for goods. Another exemplary focus area could be an advanced planning organizational (APO) focus area. APO involves advanced planning for an organization, typically sectioned according to geography, market segment or relevant time frame. So IBPs relating to these functions can be classified as APO type IBPs. Other examples of focus areas include an inventory focus area for inventory function IBPs and a manufacturing focus area for manufacturing function IBPs.

Typically, for a given period of time, all the APO functions in a business entity are performed first and completed so that the advanced planning accomplished through the APO functions can be considered in performing and executing other functions relating to operations in the given period of time. That is, the APO functions, in general, are completed before performing the functions for OTC, inventory and manufacturing. The OTC and manufacturing functions, in general, run at the same time and are followed by the inventory functions. So the IBP data main coordinating tool 110, according to this exemplary embodiment, manages and executes all the IBPs in an APO focus area prior to managing and executing the IBPs in the focus areas for OTC and manufacturing. Then the IBP data main coordinating tool 110 manages and executes the IBPs in the focus areas for OTC and manufacturing, which can be run concurrently and completed. The IBP data main coordinating tool 110 manages and executes the IBPs in the focus area for inventory. In managing the execution and performance of IBPs according to focus area, the IBP data main coordinating tool 110 organizes and executes the IBPs in an inter focus area sequence, according to a focus area execution priority.

The inter focus area sequence in this example has APO focus area IBPs executing first as the APO focus area IBPs have highest priority, followed by both the manufacturing and OTC focus area IBPs executing concurrently as these focus area IBPs have intermediate priority and can be run concurrently or in sequence to each other. Execution of the OTC and manufacturing focus area IBPs is followed by execution of the inventory focus area IBPs which, in this example, cannot run concurrently with the either the manufacturing or OTC focus area IBPs and, therefore, commence execution follow their execution. In addition, or in the alternative, to ordering IBPs for execution among multiple different focus areas according to an inter force area sequence or an inter focus area priority, the IBP data main coordinating tool 110, can manage and execute individual IBPs within a single focus area according an intra focus area sequence or an intra focus area priority. In this instance, only the IBPs within the single focus area are considered for purposes of intra focus area sequence or intra focus area priority.

As noted above, a typical OTC focus area could include different IBPs for consignment processing, sales order creation, open sales order processing, credit management, invoice processing, rebate/commission processing, credit/debit memo processing or other IBPs for similar functions relating to sales orders and accepting payments for goods. Typically, in a business entity, commencement of sales order creation precedes commencement of open sales order processing, and both of these precede commencement of invoice processing. According to this embodiment, the intra focus area priority and sequence for the OTC IBPs for these functions is the same with the commencement of IBP for sales order creation preceding the commencement of IBP for open sales order processing, and both preceding the commencement for executing IBP for invoice processing. Of course, these different IBPs could also run concurrently for different underlying transactions.

According to an embodiment, the IBP data capture tool 111 has the general role of capturing open sales order business data processed in an IBP during an ERP blackout. A detailed description of the IBP data capture tool 111, according to one embodiment, for an IBP for open sales order processing is herein described for illustrative purposes.

The open sales order processing IBP is the IBP for processing the open sales order left in the existing ERP system at the beginning of the blackout period or generated during the blackout period. Open sales order are sales orders for which customer orders were recorded, but no delivery document and plant-related processing has occurred. The sales order IBP includes a detailed instruction set which calls for gathering data on all the open orders from the existing ERP system database, marking all the open orders processed during the blackout period, and processing deliveries/billing documents manually developed using executable forms in the IBP data capture tool for the sales order IBP.

Table 1 below gives examples of the steps in the detailed instruction set in a sales order IBP data capture tool.

ing of the IBP data 111a generated during the blackout period to the IBP data main coordinating tool 110.

3. Methods

Figure 2:
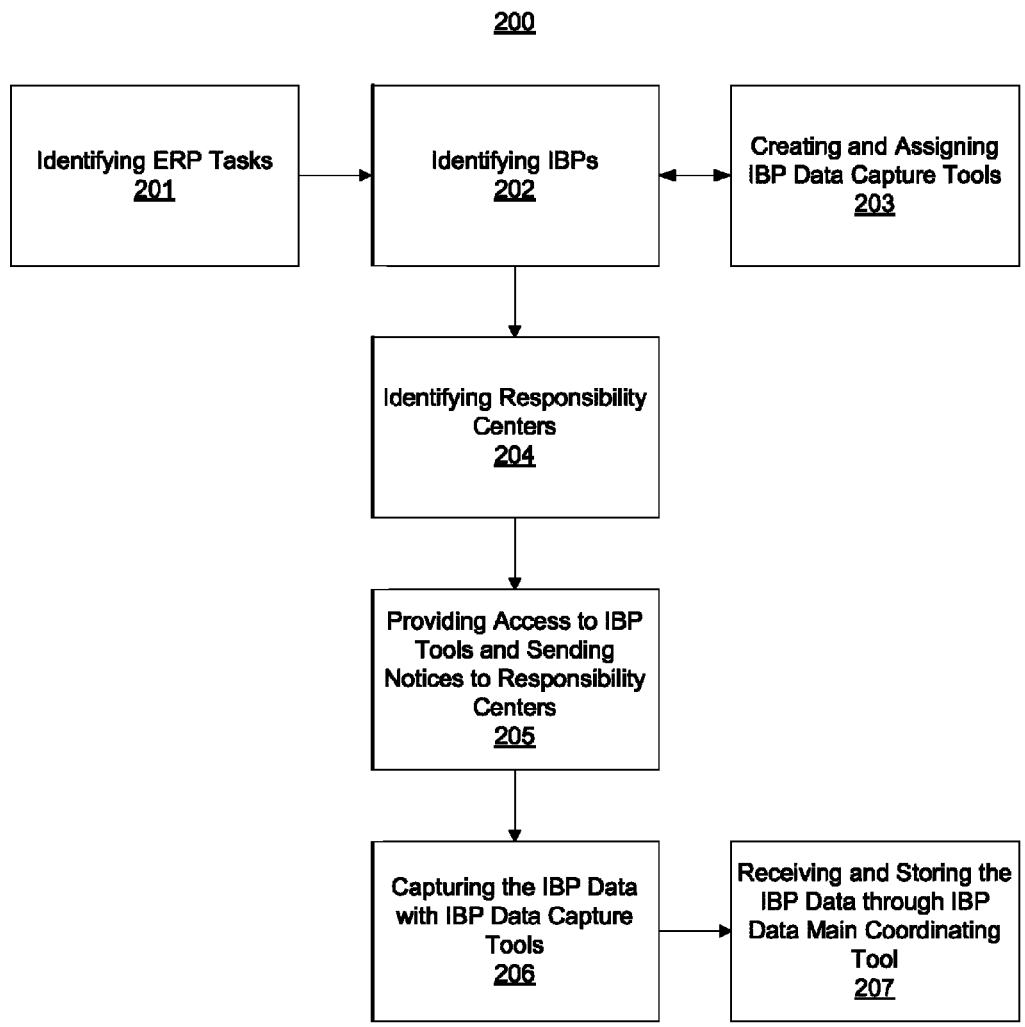
FIG. 2 illustrates a method for capturing and processing data in an ERP blackout period using the system shown in FIG. 1, according to an embodiment.

FIG. 2 illustrates method 200 for capturing and processing data, according to an embodiment. The method 200 is described with respect to the systems shown in FIG. 1A-1B by way of example and not limitation, and this method may be performed in other systems.

Referring to FIG. 2, at step 201 the ERP tasks of a company ERP system are identified. For example, the BR system 100 shown in FIG. 1A accepts information such as org data 106 and ERP tasks 107 as input data for the mapping module 101.

At step 202, the mapping module 101 identifies IBPs relating to business processes which correspond to the ERP tasks 107 identified in step 201. The IBPs are also associated with the IBP data main coordinating tool 110.

At step 203, the implementation module 102 creates or assigns the IBP data capture tools associated with IBPs identified in step 202, such as for instance IBP data capture tool I 111, IBP data capture tool II 112 and IBP data capture tool III 113. The IBP data capture tools are also associated with the IBP data main coordinating tool 110.

TABLE 1

Examples of detailed instructions/steps in a sales order IBP data capture tool instruction set.

| Step | Activity Timing | Description |
| --- | --- | --- |
| 1 | Pre-Blackout | Extract all open orders in ERP database that will be carried over to new ERP system. Check whether the order is on credit hold. |
| 2 | Pre-Blackout | For all the open orders, extract a sales order form out of the ERP database as a reference document. |
| 3 | Blackout | For any open order that needs to be processed during the blackout period, ask for Manager approval. |
| 4.1 | Blackout | For an open order that has to be processed, inform the plant for stock availability. |
| 4.2 | Blackout | Check the price and other data (if there's any special transport requirement). |
| 4.3 | Blackout | Consult with the Credit department to check if the customer has enough credit. |
| 4.4 | Blackout | Inform the plant of all the order details. |
| 5 | Blackout | Track the status of the sales order and ask the plant to provide a copy of the delivery forms issued to check the actual quantity shipped. |
| 6 | Blackout | Use the billing blackout form with all the details. This should be approved before sending the billing to the customer. |
| 7 | Blackout Recovery | Consolidate all open orders and deliveries that have been processed during the blackout period. |
| 8 | Blackout Recovery | Upload open orders via the template or create manually using the information in step 2. |
| 9 | Blackout Recovery | For open orders created via upload program and processed during the blackout period, validate any orders created by a load program, unblock the sales order.. |
| 10 | Blackout Recovery | Inform the plant once sales order has been successfully created. |
| 11 | Blackout Recovery | Create billing document using the information in billing blackout form in step 4.7. Print the invoice and check if it matches the invoice sent to the customer using the billing blackout form. |

In Table 1, steps 1 and 2 are pre-blackout preparation steps for gathering data relating to open sales orders opened prior to the beginning of the blackout period. Step 2 describes the process of extracting data from the prior ERP system so that the data relating to these open sales orders is available for processing during the blackout period. Steps 3-6 are steps which occur during the blackout period, relating to the steps which are to be followed for processing all sales orders which are to be processed during the blackout period. Steps 7-11 are data recovery steps for recovering the data generated during the blackout period. Step 8 describes the "uploading" or send- At step 204, the responsibility centers are identified which have a responsibility for operating the IBP data capture tools to capture the IBP data of the IBPs are created and/or assigned to the IBPs identified in step 202. For instance, responsibility center I 114, responsibility center II 115 and responsibility center III 116 are identified and assigned, respectively, with IBP data capture tool I 111, IBP data capture tool II 112 and IBP data capture tool III 113.

At step 205, the responsibility centers are given access to the IBP data capture tools and sent notices when to begin capturing IBP data by the implementation module 102. For instance, the implementation module 102 sends responsibility center I 114, responsibility center II 115 and responsibility center III 116 an access link for, respectively, IBP data capture tool I 111, IBP data capture tool II 112 and IBP data capture tool III 113. The implementation module 102 then sends notices 114a, notices 115a and 116a, respectively, to responsibility center I 114, responsibility center II 115 and responsibility center III 116 when to initiate IBP data capture with the data capture tools. This step may also be implemented in conjunction with the IBP data main coordinating tool, operating as a fully automated computer program or operated manually by a coordinator.

At step 206, the IBP data capture tools are used to capture the IBP data 108. Each individual responsibility center, as described above, operates the data capture tool assigned to it to generate its IBP data 109. For instance, responsibility center I 114 generates IBP data 111a using IBP data capture tool I 111.

At step 207, the IBP data is received and stored locally through the IBP data main coordinating tool 110, or received at the BR system 100 and stored in the data storage 105 through the data management module 103.

4. Technical Effects

Technical effects associated with systems and methods associated with a BR system, such as BR system 100, include the collection of IBP data 109 and production of BRS data 108 and enhancing the integrity of the data in an ERP system database. This may include data, for example, the IBP data 109 collected throughout the blackout period. The control of the IBP data 109 collection and the BRS data 108 production can provide for increased integrity of the data in an ERP database at a company, increasing operating and production efficiency in the company, and increasing the profits for a company relying on an ERP system having a higher integrity ERP system database. Also, decreases in waste for all types of resources utilized at the company can be achieved through the operation of the ERP system having a higher integrity ERP database.

Another aspect is the more economical use of memory in a computer system by allowing faster processing of IBP data 109 based on control of the IBP data 109 collection. The BR system 100 also provides a more efficient database search strategy and higher speed processing of IBP data 109 and BRS data 108. The BR system 100 achieves a minimal load of data processing. Also, the BR system 100 provides a technical tool for efficient search, retrieval and evaluation of IBP data 109 and BRS data 108 in the BR system 100.

The functions/steps of processing the IBP data 109 and BRS data 108 using the BR system 100 provide information to the user in the form of a technical tool for an intellectual task the user has to master, and hence contributes to the technical solution of a technical problem of efficient search, retrieval and evaluation of IBP data 109 and BRS data 108. The easily used IBP data 109 and BRS data 108 allows the user to grasp the ERP blackout recovery progress and the processing and collection of IBP data 109 and BRS data 108 faster and more accurately, thus facilitating ERP activity, and thus resulting in an improved, continued man-machine interaction.

5. Computer System for Executing Software

One or more of the steps and functions described herein and one or more of the components of the systems described herein may be implemented as computer code stored on a computer readable storage device, such as memory or another type of storage device. The computer code is executed on a computer system (e.g., the computer system 300 described below), for example, by a processor, application-specific integrated circuit (ASIC), or other type of circuit. The code may exist as software program(s) comprised of program instructions in source code, object code, executable code or other formats.

FIG. 3 shows a computer system 300 that may be used as a hardware platform for the BR system 100. The computer system 300 may be used as a platform for executing one or more of the steps, methods, and functions described herein that may be embodied as software stored on one or more computer readable storage devices, which are hardware storage devices.

The computer system 300 includes a processor 301 or processing circuitry that may implement or execute software instructions performing some or all of the methods, functions and other steps described herein. Commands and data from the processor 301 are communicated over a communication bus 303. The computer system 300 also includes a computer readable storage device 302, such as random access memory (RAM), where the software and data for processor 301 may reside during runtime. The storage device 302 may also include non-volatile data storage. The computer system 300 may include a network interface 304 for connecting to a network. It is apparent to one of ordinary skill in the art that other known electronic components may be added or substituted in the computer system 300.

Furthermore, the system and methods described herein are generally described with respect to a blackout recovery system, such as BR system 100 for processing IBP data 109 and BRS data 108. However, the system and methods are applicable to other types of systems for other types of data.

While the embodiments have been described with reference to examples, those skilled in the art are able to make various modifications to the described embodiments without departing from the scope of the embodiments as described in the following claims, and their equivalents.

What is claimed is:
1. A blackout recovery system to capture and process interim business process (IBP) data generated during a blackout period of an enterprise resource planning (ERP) system, the blackout recovery system comprising:
   a data storage device to store software instructions; and
   a computer processor to execute the software instructions, wherein executing the software instructions causes the system to execute:
   a mapping module to, prior to the blackout period,
      map ERP tasks, performed by the ERP system for an entity prior to the blackout period, to interim business processes (IBPs) to be performed during the blackout period,
      identify, based on data relating to an organizational structure of the entity, responsibility centers having a responsibility for storing and communicating business data associated with the ERP tasks, and
      assign to each IBP at least one of the responsibility centers; and
   an implementation module to:
      create, prior to the blackout period, IBP data capture tools to capture IBP data during the blackout period, wherein the IBP data capture tools include executable forms and templates to capture transactions as the captured IBP data;
      associate each IBP with one of the created IBP data capture tools, wherein each IBP data capture tool includes an instruction set to be sent to the responsibility center assigned to the IBP associated with the IBP data capture tool, the instruction set to include procedures to be performed to capture IBP data associated with the responsibility center;

provide each responsibility center with access to each IBP data capture tool corresponding to each IBP the responsibility center has been assigned; and send a notice to each responsibility center to begin capturing, at a predetermined time during the blackout period, the IBP data associated with each IBP assigned to the responsibility center; and a data management module to:

receive the IBP data captured during the blackout period, using the IBP data capture tools; and upload the received IBP data to an IBP main coordinating tool, the IBP main coordinating tool to forward the received IBP data to an appropriate responsibility center to add the received IBP data to an ERP database.

2. The system of claim 1, wherein the IBP data is captured according to an inter focus area sequence or inter focus area priority.

3. The system of claim 1, wherein the IBP data is captured according to an intra focus area sequence or intra focus area priority.

4. The blackout recovery system of claim 1, wherein the implementation module is to invoke an IBP data main coordinating tool to send the notices to the responsibility centers, the implementation module to determine a sequence for executing the ERP tasks performed prior to the blackout period.

5. The blackout recovery system of claim 1, wherein the instruction set for at least one of the IBP data capture tools comprises steps for the assigned responsibility center to perform prior to the blackout period, during the blackout period and after the blackout period.

6. The blackout recovery system of claim 5, wherein the steps in the instruction set to be performed prior to the blackout period include extracting open orders in a database that will be carried over to a new system, and extracting a sales order form out of the database as a reference document, wherein the steps in the instruction set to be performed during the blackout period include, for any open order that needs to be processed during the blackout period, ask for manager approval, check a price and other data for each order, consult with a credit department to check if a customer has enough credit, and track a status of each order, and wherein the steps in the instruction set to be performed after the blackout period include consolidating the open orders and deliveries that have been processed during the blackout period, upload the open orders via a template provided with the IBP data capture tool, validate the open orders, and create a billing document using the information in a billing blackout form provided with the IBP data capture tool.

7. The blackout recovery system of claim 1, wherein the main coordinating tool organizes the IBPs by function, determines an order for executing each function, and executes the IBPs for each function according to the determined order.

8. A blackout recovery system to capture and process interim business process (IBP) data generated during a blackout period of an enterprise resource planning (ERP) system, the blackout recovery system comprising:

a data storage device to store ERP tasks performed by the ERP system for an entity prior to the blackout period, the IBP data, and IBP data capture tools corresponding to interim business processes (IBPs) mapped to the ERP tasks for capturing the IBP data, wherein the IBP data capture tools include executable forms and templates to capture transactions as the captured IBP data, and wherein responsibility centers related to an organizational structure of the entity are each assigned to perform at least one of the IBPs, wherein the IBP data is captured during the blackout period using the set of IBP data capture tools, each IBP data capture tool including an instruction set to be sent to the responsibility center assigned to the IBP associated with the IBP data capture tool, the instruction set to include procedures to be performed to capture IBP data associated with the responsibility center; and a computer processor to provide send access links to the responsibility centers with access to each IBP data capture tool corresponding to each IBP the responsibility center has been assigned, send a notice to each responsibility center to begin capturing, at a predetermined time during the blackout period, the IBP data associated with each IBP that was assigned to the responsibility center, receive the IBP data captured, during the blackout period, by the IBP data capture tools, and upload the received IBP data to an IBP main coordinating tool, the IBP main coordinating tool to forward the received IBP data to an appropriate responsibility center for processing.

9. The system of claim 8, wherein the IBP data is captured according to an inter focus area sequence or inter focus area priority.

10. The system of claim 8, wherein the IBP data is captured according to an intra focus area sequence or intra focus area priority.

11. The system of claim 8, wherein the computer processor is to send the notices to the responsibility centers to begin using the IBP data capture tools at the predetermined time by determining a sequence for executing the beginning of using the IBP data capture tools based on the ERP tasks performed through the ERP system prior to the blackout period.

12. The system of claim 11, wherein the computer processor is to receive the IBP data captured using the IBP data capture tools according to the determined sequence for executing the beginning of using the IBP data capture tools.

13. The system of claim 8, wherein the computer processor is to receive, from a responsibility center in the set of responsibility centers, a second notice when the responsibility center has completed capturing the IBP data.

14. The system of claim 8, wherein a plurality of responsibility centers captures, concurrently, the IBP data for their IBPs.

15. The system of claim 8, wherein the computer processor is to send the stored IBP data to the ERP system of the entity after the blackout period, or to a second ERP system.

16. A method for capturing and processing interim business process (IBP) data generated a blackout period of an enterprise resource planning (ERP) system, the method comprising:

mapping, by a computer processor, ERP tasks performed by the ERP system for an entity prior to the blackout period to interim business processes (IBPs) to be performed during the blackout period;

identifying, based on data relating to an organizational structure of the entity, responsibility centers having a responsibility for storing and communicating business data associated with the ERP tasks;

assigning to each IBP at least one of the responsibility centers;

creating, by the computer processor prior to the blackout period, IBP data capture tools to capture IBP data during the blackout period, wherein the IBP data capture tools include executable forms and templates to capture transactions as the captured IBP data, and associating each IBP with one of the created IBP data capture tools, wherein each IBP data capture tool includes an instruction set sent to a responsibility center and the instruction set includes procedures to be performed to capture IBP data associated with the responsibility center;

providing, by the computer processor, each responsibility center with access to each IBP data capture tool corresponding to each IBP the responsibility center has been assigned;

sending, by the computer processor, a notice to each responsibility center to begin capturing, at a predetermined time during the blackout period, the IBP data associated with each IBP assigned to the responsibility center;

capturing, by the computer processor, the IBP data during the blackout period using the IBP data capture tools;

receiving, by the computer processor, the IBP data captured during the blackout period, using the IBP data capture tools; and uploading, by the computer processor, the received IBP data to an IBP main coordinating tool, the IBP main coordinating tool to forward the received IBP data to an appropriate responsibility center for processing.

17. The method according to claim 16, wherein capturing the IBP data is performed according to an inter focus area sequence or inter focus area priority.

18. The method according to claim 16, wherein capturing the IBP data is preformed according to an intra focus area sequence or intra focus area priority.

19. The method according to claim 16, further comprising determining a sequence for executing a beginning of using the IBP data capture tools based on the ERP tasks performed through the ERP system prior to the blackout period, wherein an IBP data main coordinating tool sends the notices to the responsibility centers to begin using the IBP data capture tools at their predetermined times based on the determined sequence.

20. The method according to claim 19, wherein the IBP data from the IBP data capture tools is received based on the determined sequence.

21. The method according to claim 16, further comprising receiving a second notice from a responsibility center in the set of responsibility centers that the responsibility center has completed capturing the IBP data.

22. The method according to claim 16, wherein predetermined IBP data capture tools capture their IBP data concurrently.

23. The method according to claim 16, further comprising sending the stored IBP data to the ERP system of the entity after the blackout period, or to a second ERP system.

24. A non-transitory computer readable medium comprising instructions executable on at least one computer processor to execute and process interim business process (IBP) data generated during a blackout period of an enterprise resource planning (ERP) system, the instructions to:

map ERP tasks performed by the ERP system for an entity prior to the blackout period to interim business processes (IBPs) to be performed during the blackout period;

identify, based on data relating to an organizational structure of the entity, responsibility centers having a responsibility for storing and communicating business data associated with the ERP tasks;

assign to each IBP at least one of the responsibility centers;

create, prior to the blackout period, IBP data capture tools to capture IBP data during the blackout period, wherein the IBP data capture tools include executable forms and templates for capturing transactions as the captured IBP data, and associate each IBP with one of the created IBP data capture tools, wherein each IBP data capture tool includes an instruction set to be sent to the responsibility center assigned to the IBP associated with the IBP data capture tool, the instruction set to include procedures to be performed to capture IBP data associated with the responsibility center;

provide each responsibility center with access to each IBP data capture tool corresponding to each IBP the responsibility center has been assigned;

send a notice to each responsibility center to begin capturing, at a predetermined time during the blackout period, the IBP data associated with each IBP assigned to the responsibility center;

capture the IBP data during the blackout period using the IBP data capture tools;

receive the IBP data from the IBP data capture tools; and upload the received IBP data to an IBP main coordinating tool, the IBP main coordinating tool to forward the received IBP data to an appropriate responsibility center for processing.

25. The non-transitory computer readable medium according to claim 24, wherein the instructions to capture the IBP data captures the IBP data according to an inter focus area sequence or inter focus area priority.

26. The non-transitory computer readable medium according to claim 24, wherein instructions of the instruction set to capture the IBP data captures the IBP data according to an intra focus area sequence or intra focus area priority.

27. The non-transitory computer readable medium of claim 24, wherein instructions of the instruction set are to determine a sequence for executing a beginning of using the IBP data capture tools based on the ERP tasks performed through the ERP system prior to the blackout period, wherein an IBP data main coordinating tool sends the notices to the responsibility centers to begin using the IBP data capture tools at their predetermined times based on the determined sequence.

* * * * *

UNITED STATES PATENT AND TRADEMARK OFFICE
CERTIFICATE OF CORRECTION

| | | |
|---|---|---|
| PATENT NO. | : 8,751,276 B2 | |
| APPLICATION NO. | : 12/843246 | |
| DATED | : June 10, 2014 | |
| INVENTOR(S) | : Jason B. Gillis et al. | |

It is certified that error appears in the above-identified patent and that said Letters Patent is hereby corrected as shown below:

In the Claims:

In column 14, line 15, delete "send access links to".

Signed and Sealed this
Ninth Day of September, 2014

Michelle K. Lee
*Deputy Director of the United States Patent and Trademark Office*